(12) United States Patent
Allen

(10) Patent No.: US 6,957,823 B1
(45) Date of Patent: Oct. 25, 2005

(54) HITCH ASSEMBLY

(76) Inventor: David E. Allen, 2589 Windsor Place Rd., Tupelo, MS (US) 38804

( * ) Notice: Subject to any disclaimer, the term of this patent is extended or adjusted under 35 U.S.C. 154(b) by 0 days.

(21) Appl. No.: 10/894,324

(22) Filed: Jul. 19, 2004

(51) Int. Cl.[7] .......................................... B62D 53/08
(52) U.S. Cl. .................................. 280/439; 280/438.1
(58) Field of Search ............................... 280/439, 440, 280/441, 441.1, 438.1

(56) References Cited

U.S. PATENT DOCUMENTS

| | | | |
|---|---|---|---|
| 1,245,277 A | | 11/1917 | Shadbolt |
| 1,863,120 A | | 6/1932 | Martin |
| 1,944,775 A | * | 1/1934 | Winn ........................ 280/420 |
| 2,667,364 A | * | 1/1954 | Colpo ........................ 280/432 |
| 2,670,220 A | * | 2/1954 | Colpo ..................... 280/441.1 |
| 2,863,674 A | | 12/1958 | Baade |
| 2,976,964 A | * | 3/1961 | Thompson .............. 188/112 R |
| 3,020,065 A | | 2/1962 | Sandefur |
| 4,580,806 A | | 4/1986 | Kolstad et al. |
| 5,328,198 A | | 7/1994 | Adams |
| 5,785,341 A | | 7/1998 | Fenton |
| 5,839,745 A | * | 11/1998 | Cattau et al. ............... 280/434 |
| 6,170,849 B1 | | 1/2001 | McCall |
| 6,474,674 B2 | | 11/2002 | Piercey, III |
| 6,581,951 B2 | | 6/2003 | Lange |
| 6,692,013 B1 | * | 2/2004 | Zebolsky et al. ........... 280/439 |
| 2003/0001361 A1 | | 1/2003 | Laarman et al. |
| 2003/0047907 A1 | | 3/2003 | Hicks et al. |

* cited by examiner

*Primary Examiner*—Tony Winner
(74) *Attorney, Agent, or Firm*—Walker, McKenzie & Walker, P.C.

(57) ABSTRACT

A hitch assembly including a frame for being attached to a tow vehicle; a cradle assembly pivotally attached to the frame for pivotal fore and aft movement; a hitch receiver mounted to the cradle assembly for being attached to a trailer; a leaf spring mounted to the cradle assembly and the fore end of the frame for controlling fore and aft movement of the cradle assembly; and shock absorbers mounted to the cradle assembly and the aft end of the frame for dampening fore and aft movement of the cradle assembly.

5 Claims, 3 Drawing Sheets

HITCH ASSEMBLY

BACKGROUND OF THE INVENTION

1. Field of the Invention

The present invention relates to a hitch assembly for coupling a trailer to a tow vehicle and for allowing significant fore and aft, spring controlled and shock dampened movement.

2. Background Art

A preliminary patentability search in Class 280, Subclasses 438.1, 439, 433, 440 and 489, produced the following references, which appear to be relevant to the present invention: Shadbolt, U.S. Pat. No. 1,245,277; Martin, U.S. Pat. No. 1,863,120; Baade, U.S. Pat. No. 2,863,674; Sandefur, U.S. Pat. No. 3,020,065; Piercey, U.S. Pat. No. 6,474,674; Kolstad, U.S. Pat. No. 4,580,806; Adams, U.S. Pat. No. 5,328,198; Fenton, U.S. Pat. No. 5,785,341; McCall, U.S. Pat. No. 6,170,849; Lange, U.S. Pat. No. 6,581,951; Laarman, U.S. Patent Application 2003/0001361; and Hicks, U.S. Patent Application 2003/0047907.

None of these references, either singly or in combination, disclose or suggest the present invention. More specifically, nothing in the prior art discloses a hitch assembly including a frame for being attached to a tow vehicle; a cradle assembly pivotally attached to the frame for pivotal fore and aft movement; a hitch receiver mounted to the cradle assembly for being attached to a trailer; a leaf spring mounted to the cradle assembly and the fore end of the frame for controlling fore and aft movement of the cradle assembly; and shock absorbers mounted to the cradle assembly and the aft end of the frame for dampening fore and aft movement of the cradle assembly.

BRIEF SUMMARY OF THE INVENTION

The present invention introduces a new concept in 5th wheel recreational vehicle towing and is designed to minimize the unwanted and always annoying effects of the "bucking and jerking" so common to conventional 5th wheel hitches. When a tow vehicle and trailer are underway, constantly varying forces exert push and pull on the hitch between the tow vehicle and trailer. This phenomenon is especially apparent on rough roads when driver and passengers are subjected to incessant bucking and jerking. On occasion, when the road is particularly rough, this effect is so strong that a reduction in speed is prudent to reduce the possibility of physical damage to the hitch or its mounting. The present invention easily accommodates the above-described forces by allowing up to 6 or 7 inches (15.24 or 17.78 centimeters) of fore and aft movement between the tow vehicle and trailer, controlled by a leaf spring and dampened by heavy-duty automotive shock absorbers, while heavy rubber bumpers restrict movement to the working limits of the hitch. The result is a surprising reduction of the annoying and sometimes destructive forces so common to the conventional hitch.

DETAILED DESCRIPTION OF THE INVENTION

Figure 1:
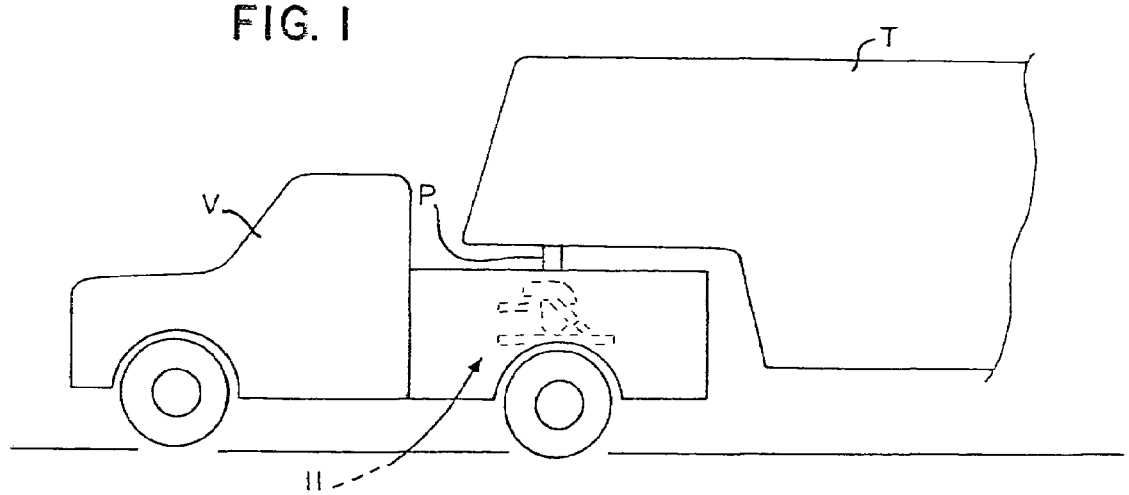
FIG. 1 is somewhat diagrammatic side elevational view of the hitch assembly of the present invention shown in combination with a tow vehicle and a trailer.
Figure 2:
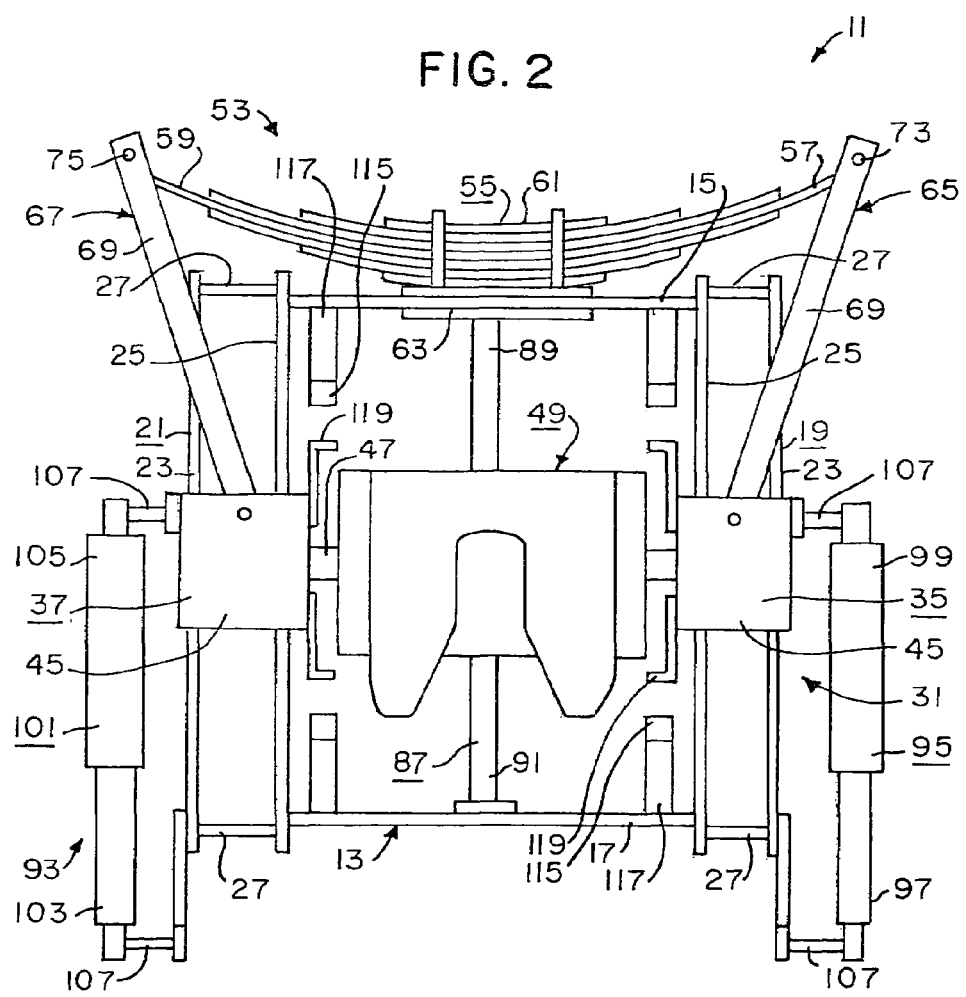
FIG. 2 is top plan view of the hitch assembly of the present invention.
Figure 3:
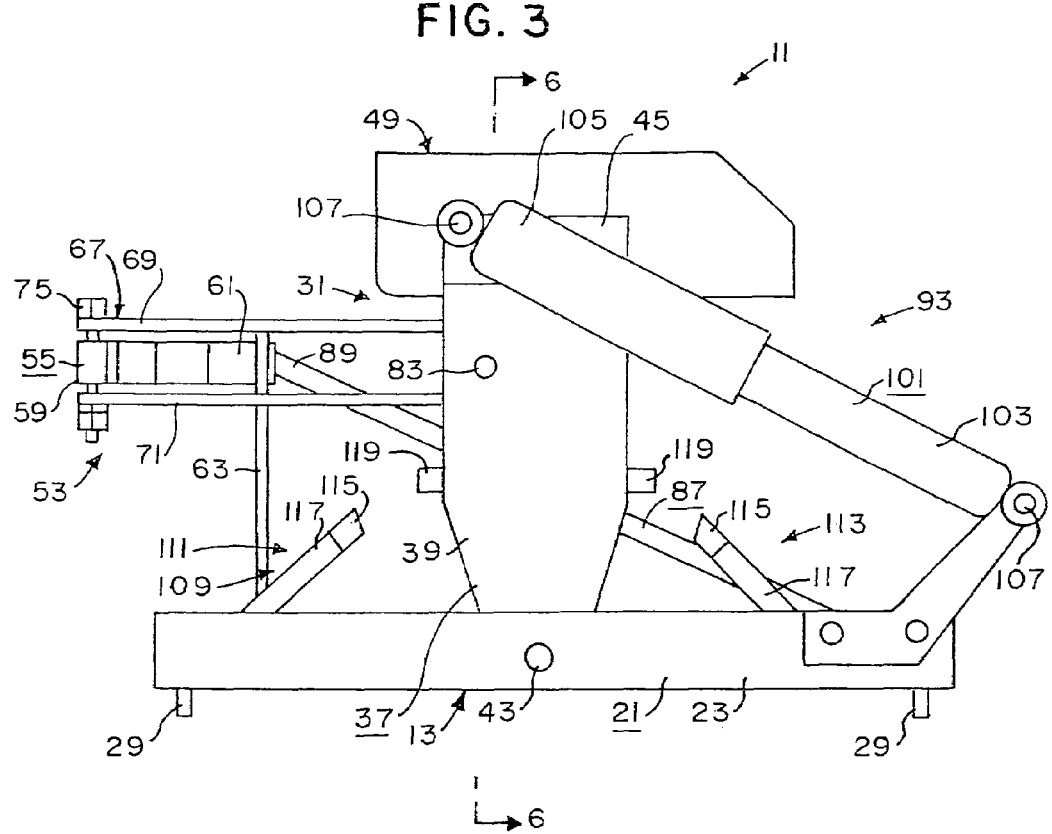
FIG. 3 is a somewhat diagrammatic side elevational view of the hitch assembly of the present invention shown in a neutral position.
Figure 4:
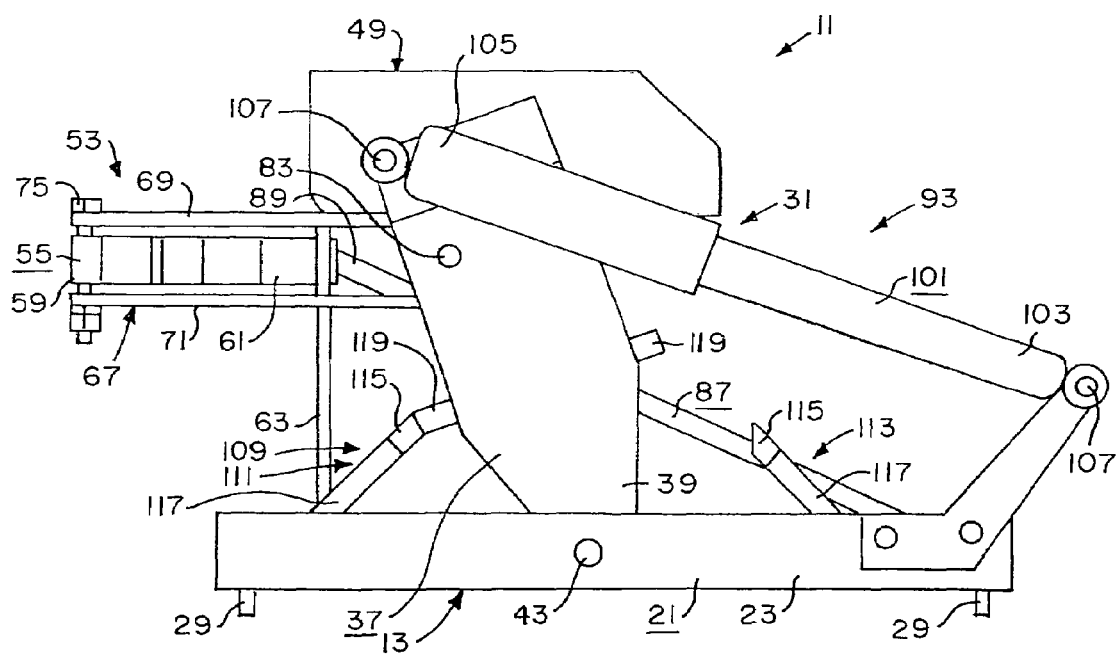
FIG. 4 is a somewhat diagrammatic side elevational view of the hitch assembly of the present invention shown in a fore position.
Figure 5:
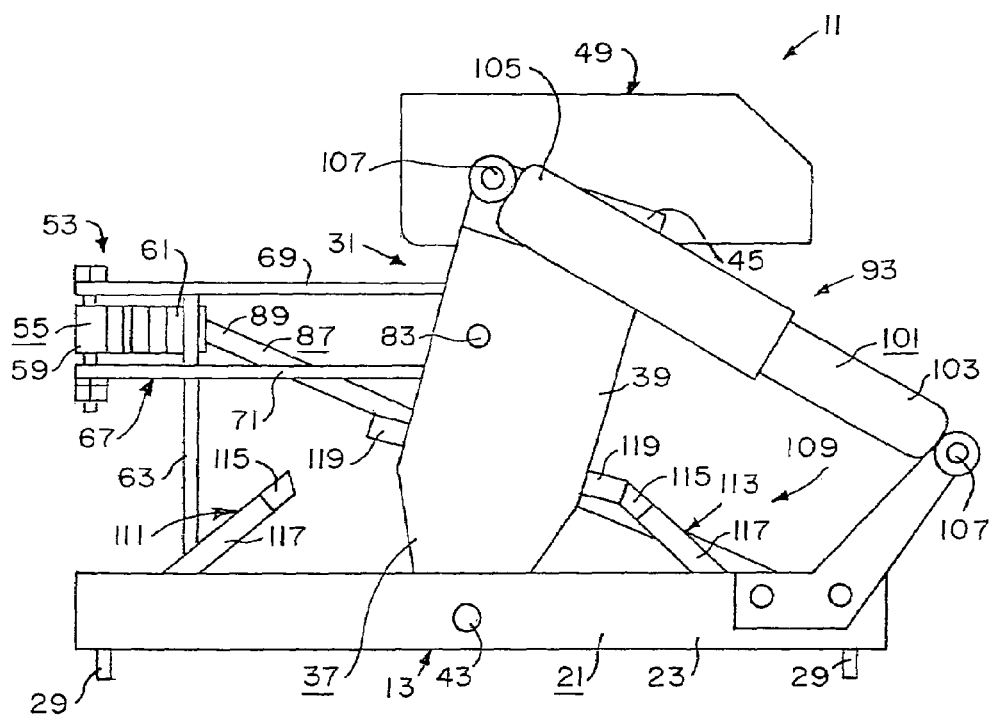
FIG. 5 is a somewhat diagrammatic side elevational view of the hitch assembly of the present invention shown in an aft position.

The preferred embodiment of the hitch assembly of the present invention is shown in FIGS. 1–6, and identified by the numeral 11. The hitch assembly 11 is used to couple a trailer T to a tow vehicle V in a manner that allows significant fore and aft, spring controlled and shock dampened movement between the trailer T and tow vehicle V.

The hitch assembly 11 includes a frame 13 for being attached to the tow vehicle V. The frame 13 preferably consists of an open structure including a front crosspiece 15, a rear crosspiece 17, a right side construct 19 extending between the right ends of the front and rear crosspieces 15, 17, and a left side construct 21 extending between the left ends of the front and rear crosspieces 15, 17. Each side construct 19, 21 preferably includes an outer rail 23 and an inner rail 25 extending parallel to and spaced apart from one another, and joined together at opposite ends with end crosspieces 27. Lugs 29 are provided along the crosspieces 17, 19, 27, etc., to allow the frame 13 to be fixed solidly and immovably to the tow vehicle V, e.g., to the chassis of the tow vehicle V, by bolts or the like (not shown). The frame 13 may be constructed in various sizes and out of various materials as will now be apparent to those skilled in the art. Thus, for example, the various pieces of the frame 13 may be constructed out of standard steel structural members, cut or otherwise formed to the desired shape, and welded, bolted, or otherwise joined together to form a strong framework as will now be apparent to those skilled in the art.

Figure 6:
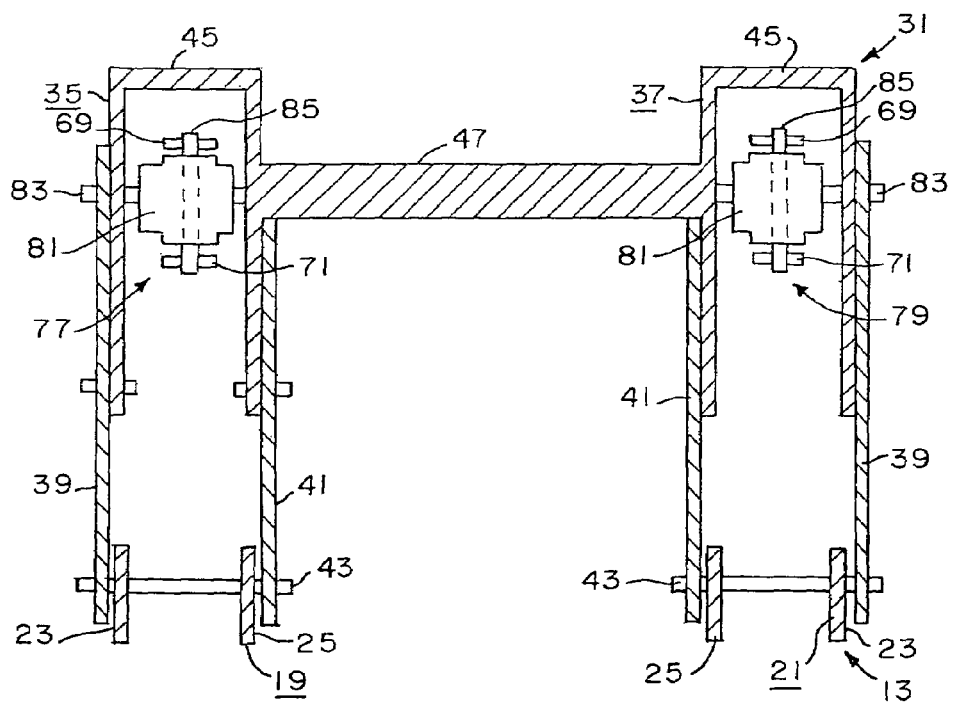
FIG. 6 is a somewhat diagrammatic sectional view substantially as taken on line 6—6 of FIG. 3 with portions omitted for clarity.

The hitch assembly 11 includes a cradle assembly 31 pivotally attached to the frame 13. The cradle assembly 31 includes a right side cradle leg or cradle leg construct 35 pivotally attaching the right side of the cradle assembly 31 to the right side of the frame 13, and a left side cradle leg or cradle leg construct 37 pivotally attaching the left side of the cradle assembly 31 to the left side of the frame 13. Preferably each cradle leg 35, 37 includes an outer leg 39 and an inner leg 41 extending parallel to and spaced apart from one another, and pivotally attached at the lower ends thereof to the outer and inner rails 23, 25 of the respective right and left side constructs 19, 21 of the frame 13 by way of respective right and left pivot bolts 43 or the like. Each cradle leg 35, 37 may have a U-shaped member 45 attached to and joining the upper ends of each respective sets of outer and inner legs 39, 41. The components of each cradle leg 35, 37 are preferably joined together by bolts or the like to allow cradle height adjustment between, for example, the legs 39, 41 and the U-shaped member 45 as clearly illustrated in FIG. 6 and as will now be apparent to those skilled in the art. The cradle assembly 31 preferably includes a transverse body member or bar 47 extending between and joining the U-shaped member 45, etc., of the cradle legs 35, 37. The bar 47 thus permanently joins together the right and left side cradle leg constructs or segments 35, 37 of the cradle 31. The cradle assembly 31 may be constructed in various sizes and out of various materials as will now be apparent to those skilled in the art. Thus, for example, the various pieces of the cradle assembly 31 may be constructed separately out of standard steel structural members, cut or otherwise formed to the desired shape, and welded, bolted, or otherwise joined together to form a strong construct. Alternatively, all or part of the cradle assembly 31 may be constructed as an integral one-piece unit (thus, for example, the U-shaped members 45 and the bar 47 may be constructed as a one-piece unit as shown in FIG. 6), as will now be apparent to those skilled in the art.

The hitch assembly 11 includes a hitch receiver 49 mounted to the cradle assembly 31. The hitch receiver 49 is preferably a typical fifth-wheel hitch receiver of any standard construction and operation well known to those skilled in the art for accepting and locking onto the hitch pin P of the trailer T via a handle-operated locking mechanism or the like (not shown), to thereby hitch the trailer T to the hitch assembly 11 and, thus, the tow vehicle V. The hitch receiver 49 may be attached to the cradle assembly 31 in the typical manner, commonly at two points, and will pivot with the cradle assembly 31 relative to the frame 13, as will now be apparent to those skilled in the art. A typical fifth-wheel hitch receiver of the type that can be used for the hitch receiver 49 of the present invention is disclosed as "saddle 64" in Lange, U.S. Pat. No. 6,581,951, issued Jun. 24, 2003, incorporated herein by reference.

The hitch assembly 11 includes fore spring or leaf spring means 53 between the cradle assembly 31 and the front of the frame 13 for controlling fore and aft movement of the cradle assembly 31. The leaf spring means 53 preferably includes a standard leaf spring 55 composed of multiple layers (leaves) of elongated spring metal bracketed together, and having a first or right end 57, a second or left end 59, and a midportion 61. The midportion 61 of the leaf spring 55 is preferably attached to the front crosspiece 15 of the frame 13 by way of a spring mounting plate 63 having a lower end bolted or otherwise attached to the midportion of the front crosspiece 15 and having an upper end bolted (via U-bolts) or otherwise attached to the midportion 61 of the leaf spring 55. The right end 57 of the leaf spring 55 is preferably attached to the right side cradle leg construct 35 by way of a right cradle/spring control rod construct 65, while the left end 59 of the leaf spring 55 is preferably attached to the left side cradle leg construct 37 by way of a left cradle/spring control rod construct 67. Each cradle/spring control rod construct 65, 67 preferably includes an elongated upper cradle-spring control rod or arm 69 and an elongated lower cradle-spring control rod or arm 71 extending between the respective left and right ends 57, 59 of the leaf spring 55 and the respective right and left side cradle leg constructs 35, 37. Each cradle-spring control rod 69, 71 is preferably identical to one another. A right leaf spring end bolt 73 is preferably used to join the front ends of the upper and lower cradle-spring control rods 69, 71 of the right cradle/spring control rod construct 65 to the respective upper and lower sides of the right end 57 of the leaf spring 55 with the upper and lower cradle-spring control rods 69, 71 spaced apart and parallel to one another. Likewise, a left leaf spring end bolt 75 is preferably used to join the front ends of the upper and lower cradle-spring control rods 69, 71 of the left cradle/spring control rod construct 67 to the respective upper and lower sides of the left end 59 of the leaf spring 55 with the upper and lower cradle-spring control rods 69, 71 spaced apart and parallel to one another. The bolts 73, 75 are snug but not tight, thus allowing free movement of the respective right and left ends 57, 59 of the leaf spring 55. Right and left flexible couplings 77, 79 are preferably provided for joining the rear ends of the upper and lower cradle-spring control rods 69, 71 of the respective right and left cradle/spring control rod constructs 65, 67 to the respective right and left side cradle leg constructs 35, 37 of the cradle assembly 31. Each flexible coupling 77, 79 preferably includes a body member 81 rotatably mounted to the respective right and left side cradle leg constructs 35, 37 by way of a horizontally mounted bolt 83, the bolt 83 being snug but not tight, thus allowing the body member 81 to rotate about the bolt 83; and rotatably mounted to the rear ends of the upper and lower cradle-spring control rods 69, 71 of the respective right and left cradle/spring control rod constructs 65, 67 by a vertically mounted bolt 85, the bolt 85 being snug but not tight, thus allowing the rear ends of the upper and lower cradle-spring control rods 69, 71 to rotate about the bolt 85. The flexible couplings 77, 79 are basically U-joints which allow for minor movement of the rear ends of the cradle-spring control rods 69, 71 in both the vertical and horizontal planes. Body member 81 rotates about bolt 83, but not bolt 85.

The hitch assembly 11 preferably includes a thrust bar 87 mounted between the frame 13 and the leaf spring 55 to help fixedly mount the leaf spring 55 to the frame 13. The thrust bar 87 preferably consists of a strong, rigid, elongated bar having a first or front end 89 attached to the midportion 61 of the leaf spring 55 or the upper end of the spring mounting plate 63, and a second or rear end 91 attached to the midportion of the rear crosspiece 17 of the frame 13 to absorb thrust forces created by movement of the cradle assembly 31 against the leaf spring means 53.

The hitch assembly includes an aft spring, or shock absorber, means 93 for dampening sudden and rapid motion of the cradle assembly 31 about the pivot bolts 43. The shock absorber means 93 preferably includes a first or right side shock absorber 95 having a first or lower end 97 mounted to the rear end of frame 13 and a second or upper end 99 mounted to the cradle assembly 31. The shock absorber means 93 preferably includes a second or left side shock absorber 101 having a first or lower end 103 mounted to the rear end of frame 13 and a second or upper end 105 mounted to the cradle assembly 31. The shock absorbers 95, 101 may be conventional, heavy duty automotive or truck shock absorbers well known to those skilled in the art, mounted to the respective portions of the frame 13 and cradle assembly 31 via pivot bolts 107 or the like.

The hitch assembly 11 preferably includes stop means 109 for limiting the fore and aft movement of the cradle assembly 31. The stop means 109 preferably includes front stop means 111 for limiting the fore movement of the cradle assembly 31 to approximately 15°, and rear stop means 113 for limiting the aft movement of the cradle assembly 31 to approximately 15°, thus allowing a total fore and aft movement of the cradle assembly 31 of approximately 30° about the pivot bolts 43. Each stop means 111, 113 preferably includes a pair of rubber bumpers 115 attached to the frame 13 via a bracket 117 or the like, with one bumper 115 on the right side of the frame 13 and the other bumper 115 on the left side of the frame 13. Further, each stop means 111, 113 preferably includes a pair of bumper stops 119 attached to the cradle assembly 31 in proper locations to engage respective ones of the rubber bumpers 115 when the cradle assembly 31 moves fore or aft the desired maximum amount (e.g., 15° fore or aft).

To use the hitch assembly 11, the frame 13 is attached to the tow vehicle V via lugs 29 or the like. The receiver 49 rests upon the cradle assembly 31, but is not rigidly affixed thereof as will now be apparent to those skilled in the art. The trailer T is connected to the receiver 49 in any conventional manner (i.e., by backing the tow vehicle V under the hitch pin P of the trailer T so that the hitch P engages the receiver 49 and can be locked to the receiver 49 via the handle-operated locking mechanism, etc. The receiver 49 is the only point of contact between the tow vehicle V and the trailer T. Disparate forces between the tow vehicle V and the trailer T are exerted at the receiver 49 and, thence, by way of its mounting, to the cradle assembly 31, causing the cradle assembly 31 to rotate about the pivot bolts 43 in a fore or aft direction, activating the leaf spring means 53 and the shock absorber means 93. The rotational movement of the cradle assembly 31 is transmitted by way of the flexible couplings 77, 79 and cradle spring control rod constructs 65, 67 to linear movement of the ends 57, 59 of the leaf spring 55. The leaf spring 55, by design, resists the movement of the cradle assembly 31, always attempting to return the cradle assembly 31 to a mid-point or neutral position. In operation (i.e., when towing the trailer T), unwanted forces such as those caused by routine traverse of potholes, roadway cross strips, bridge abutments and rail crossings, constantly batter the trailer hitch pin P and hitch receiver 49. Normally, the adverse affects of such action results in wear and tear involving the entire towing operation including the trailer T and its contents, the tow vehicle V and its contents and occupants, and the hitch assembly itself. The hitch assembly 11 of the present invention accommodates these unwanted forces in a simple and straightforward way by allowing up to six inches (15.24 centimeters) of free, virtually frictionless movement between the trailer T and tow vehicle V. The measure of displacement of the receiver 49 at any given instant is directly proportional to the disparity of the forces involved, controlled by the leaf spring means 53, the shock absorber means 93, and, at the extreme limits of allowable movement, the rubber bumpers 115.

Although the present invention has been described and illustrated with respect to a preferred embodiment and a preferred use therefor, it is not to be so limited since modifications and changes can be made therein which are within the full intended scope of the invention.

What is claimed is:

1. A hitch assembly for coupling a trailer to a tow vehicle: said hitch assembly comprising:
   (a) a frame for being attached to the tow vehicle, said frame having a fore end and an aft end;
   (b) a cradle assembly pivotally attached to said frame for pivotal fore and aft movement between a fore position and an aft position;
   (c) a hitch receiver mounted to said cradle assembly for being attached to the trailer;
   (d) fore spring means mounted to said cradle assembly and said fore end of said frame for controlling fore and aft movement of said cradle assembly; said fore spring means including a leaf spring having a first end, a second end, and a midportion; said midportion of said leaf spring being attached to said frame;
   (e) aft spring means mounted to said cradle assembly and said aft end of said frame for dampening fore and aft movement of said cradle assembly;
   (f) a first control rod construct attaching said first end of said leaf spring to said cradle assembly; and
   (g) a second control rod construct attaching said second end of said leaf spring to said cradle assembly.

2. The hitch assembly of claim 1 in which is included a thrust bar having a first end attached to said midportion of said leaf spring and having a second end attached to said aft end of said frame.

3. A hitch assembly for coupling a trailer to a tow vehicle; said hitch assembly comprising:
   (a) a frame for being attached to the tow vehicle, said frame having a fore end and an aft end;
   (b) a cradle assembly pivotally attached to said frame for pivotal fore and aft movement between a fore position and an aft position: said cradle assembly including a right side cradle leg construct, a left side cradle leg construct, and a transverse body member joining said right and left side cradle leg constructs together;
   (c) a hitch receiver mounted to said cradle assembly for being attached to the trailer;
   (d) fore spring means mounted to said cradle assembly and said fore end of said frame for controlling fore and aft movement of said cradle assembly;
   (e) aft spring means mounted to said cradle assembly and said aft end of said frame for dampening fore and aft movement of said cradle assembly;
   (f) a right pivot bolt pivotally joining said right side cradle leg construct to said frame;
   (g) a left pivot bolt pivotally joining said left side cradle leg construct to said frame;
   (h) fore stop means for limiting the fore movement of said cradle assembly to approximately 15°; and
   (i) aft stop means for limiting the aft movement of said cradle assembly to approximately 15°.

4. The hitch assembly of claim 3 in which said fore stop means includes a rubber bumper; and in which said aft stop means includes a rubber bumper.

5. A hitch assembly for coupling a trailer to a tow vehicle; said hitch assembly comprising:
   (a) a frame for being attached to the tow vehicle, said frame including a front crosspiece having a right end and a left end, a rear crosspiece having a right end and a left end, a right side construct extending between said right ends of said front and rear crosspieces, and a left side construct extending between said left ends of said front and rear crosspieces;
   (b) a cradle assembly pivotally attached to said frame for pivotal fore and aft movement between a fore position and an aft position; said cradle assembly including a right side cradle leg construct, a left side cradle leg construct, and a transverse body member joining said right and left side cradle leg constructs together;
   (c) a right pivot bolt pivotally joining said right side cradle leg construct to said frame;
   (d) a left pivot bolt pivotally joining said left side cradle leg construct to said frame;
   (e) a hitch receiver mounted to said cradle assembly for being attached to the trailer;
   (f) fore spring means mounted to said cradle assembly and said fore end of said frame for controlling fore and aft movement of said cradle assembly; said fore spring means including a leaf spring having a first end, a second end, and a midportion;
   (g) a spring mounting plate having a lower end attached to said frame and having an upper end attached to said midportion of said leaf spring;
   (h) a first control rod construct attaching said first end of said leaf spring to said cradle assembly; and a second control rod construct attaching said second end of said leaf spring to said cradle assembly;

(i) a thrust bar having a first end attached to said midportion of said leaf spring and having a second end attached to said aft end of said frame;

(j) aft spring means mounted to said cradle assembly and said aft end of said frame for dampening fore and aft movement of said cradle assembly; said aft spring means including a right side shock absorber having a lower end mounted to said rear crosspiece of said frame and having an upper end mounted to said cradle assembly; said aft spring means including a left side shock absorber having a lower end mounted to said rear crosspiece of said frame and having an upper end mounted to said cradle assembly;

(k) fore stop means for limiting the fore movement of said cradle assembly to approximately 15°; said fore stop means includes a rubber bumper; and (l) aft stop means for limiting the aft movement of said cradle assembly to approximately 15°; said aft stop means includes a rubber bumper.

* * * * *